(12) United States Patent
Park (10) Patent No.: US 8,112,109 B2
(45) Date of Patent: Feb. 7, 2012

(54) REFLECTING UNIT FOR A PORTABLE ELECTRONIC DEVICE

(75) Inventor: Su-Bum Park, Seoul (KR)

(73) Assignee: LG Electronics Inc., Seoul (KR)

( * ) Notice: Subject to any disclaimer, the term of this patent is extended or adjusted under 35 U.S.C. 154(b) by 886 days.

(21) Appl. No.: 11/873,368

(22) Filed: Oct. 16, 2007

(65) Prior Publication Data

US 2008/0205873 A1   Aug. 28, 2008

(30) Foreign Application Priority Data

Feb. 22, 2007  (KR) .................... 10-2007-0017995

(51) Int. Cl.
*H04M 1/00*   (2006.01)
(52) U.S. Cl. ................. 455/550.1; 455/575.1
(58) Field of Classification Search ............ 455/550.1, 455/556.1, 575.1, 575.3, 575.4, 575.8, 90.3
See application file for complete search history.

(56) References Cited

U.S. PATENT DOCUMENTS

| | | | | |
|---|---|---|---|---|
| 4,560,261 A | * | 12/1985 | Ueda et al. | 396/336 |
| 2005/0107117 A1 | * | 5/2005 | Makino | 455/556.1 |
| 2005/0264984 A1 | * | 12/2005 | Lee | 361/681 |

FOREIGN PATENT DOCUMENTS

| | | |
|---|---|---|
| EP | 1431804 | 6/2004 |
| EP | 1601166 | 11/2005 |
| GB | 2119941 | 11/1983 |
| GB | 2351848 | 1/2001 |
| JP | 2002-079605 | 3/2002 |
| JP | 2006303720 | 11/2006 |
| KR | 2004-0025815 | 3/2004 |
| RU | 2099788 | 12/1997 |
| RU | 2291876 | 5/2005 |
| SU | 1749880 | 7/1992 |
| TW | 254146 | 5/2006 |

* cited by examiner

*Primary Examiner* — Ping Hsieh
(74) *Attorney, Agent, or Firm* — Lee, Hong, Degerman, Kang & Waimey (57) ABSTRACT

A reflector for a mobile terminal includes a plate having a front and rear side, such that the plate is configured to be located on a mobile terminal. The reflector further includes a recess formed in the rear side of the plate, such that the recess is shaped to form a concave portion, and reflecting material positioned along the concave portion to reflect light incident on the front side of at least a portion of the plate.

5 Claims, 7 Drawing Sheets

REFLECTING UNIT FOR A PORTABLE ELECTRONIC DEVICE

CROSS-REFERENCE TO RELATED APPLICATIONS

Pursuant to 35 U.S.C. §119(a), this application claims the benefit of earlier filing date and right of priority to Korean Application No. 10-2007-0017995, filed on Feb. 22, 2007, the contents of which are hereby incorporated by reference herein in their entirety

FIELD OF THE INVENTION

The present invention generally relates to wireless communications, and in particular, to a reflector for a mobile terminal.

DISCUSSION OF THE RELATED ART

Portable electronic devices, such as mobile terminals, are commonly manufactured so that they can be conveniently carried. There has also been a tendency to integrate functions of other devices with the mobile terminal. Some mobile terminals include a mirror formed in the housing of the terminal. However, the size of such mirrors is such that it is difficult for a user to view their entire face. To alleviate such problems, some mobile terminals include a rounded protruding mirror which provides a greater field of view. It is common for such mirrors to be formed from stainless steel. A drawback of these mirrors is that they are susceptible to external forces such that they are often separated from the mobile terminal during everyday use. Moreover, the stainless steel material used to form the mirror is relatively expensive.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a reflector for a mobile terminal includes a plate having a front and rear side, such that the plate is configured to be located on a mobile terminal. The reflector further includes a recess formed in the rear side of the plate, such that the recess is shaped to form a concave portion. The reflector further includes reflecting material positioned along the concave portion to reflect light incident on the front side of at least a portion of the plate.

In one feature, the plate includes material which is at least substantially transparent.

In another feature, the reflecting material includes light reflecting particles.

In yet another feature, the light reflecting particles includes nickel.

In still yet another feature, the reflector further includes protective material positioned over the reflecting material.

In one aspect, the rear side of the plate further includes a first portion structured to be positioned over a camera lens associated with a camera which is coupled to the mobile terminal.

In another aspect, the plate is structured to be proximately located relative to a camera lens associated with a camera which is coupled to the mobile terminal.

In yet another aspect, the rear side of the plate further includes a non-concave portion.

In still yet another feature, the reflecting material is positioned along substantially all of the rear side of the plate.

In accordance with an alternative embodiment, a portable electronic device includes a housing shaped to contain components supporting functions associated with the electronic device, such that the housing includes an exterior side and an interior side. The device also includes a recess formed in the interior side of the housing, the recess being shaped to form a concave portion, and reflecting material positioned along the concave portion to reflect light incident on at least a portion of the exterior side of the housing.

In accordance with another alternative embodiment, a portable electronic device includes a housing shaped to contain components supporting functions associated with the electronic device, and a mounting portion located on the housing configured to receive a reflector. The reflector includes a plate having a front and rear side, and a recess formed in the rear side of the plate, the recess is shaped to form a concave portion, and reflecting material positioned along the concave portion to reflect light incident on the front side of at least a portion of the plate.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
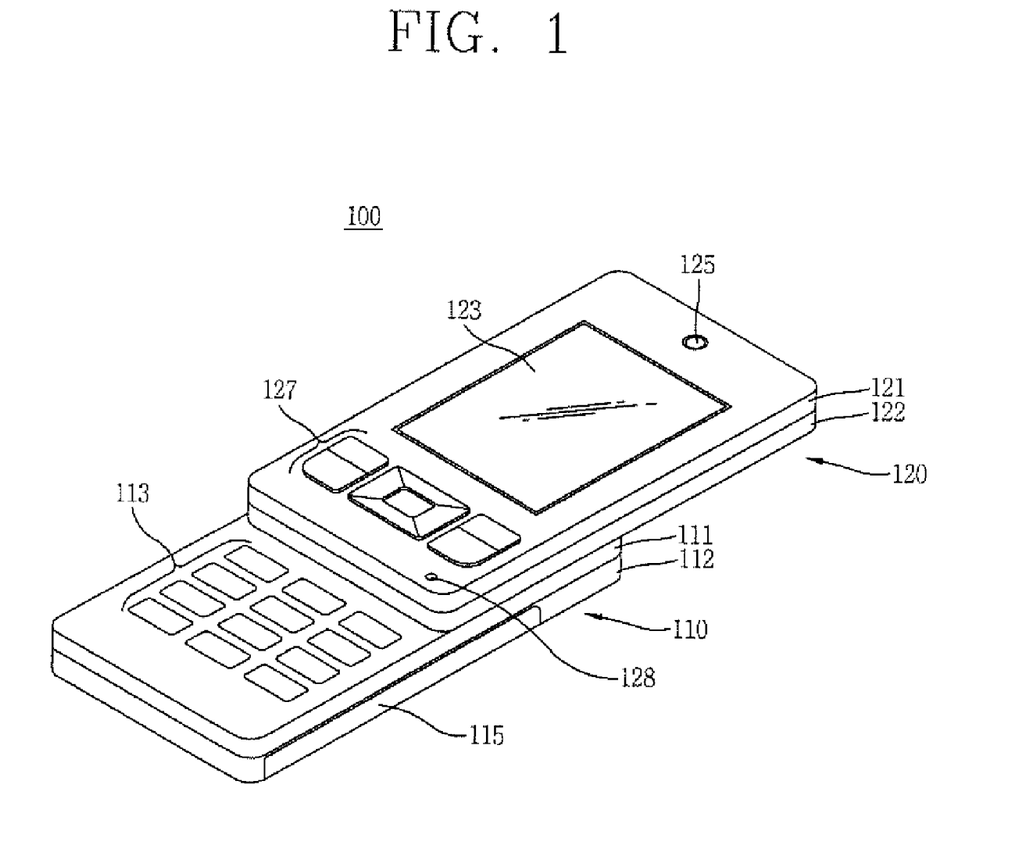
FIG. 1 depicts a mobile terminal which is generally configured with a communication module to support wireless communications with a communication network.

FIG. 1 depicts a mobile terminal 100 which is generally configured with a communication module to support wireless communications with a communication network.

Various embodiments will be described in conjunction with a mobile terminal. However, such teachings apply also to other types of portable electronic devices. Examples of such devices include portable devices, digital broadcast receiving terminals, MP3 players, personal digital assistants (PDAs), portable multimedia players (PMPs), portable music players, potable calculators, and the like.

Mobile terminal 100 is shown implemented as a slide-type mobile terminal having a first body 110 which is configured to slideably receive a second body 120. The first body includes upper housing 111 and lower housing 112, and the second body includes upper housing 121 and lower housing 122. Each of the first and second bodies is typically sized to receive components necessary to support operation of the mobile terminal.

Upper housing 111 includes input keys 113 to permit user input. Battery 115 provides necessary power for the mobile terminal. Various components may be located on the second body 120. Examples of such components include display 123, speaker 125, input keys 127, and microphone 128.

Figure 2:
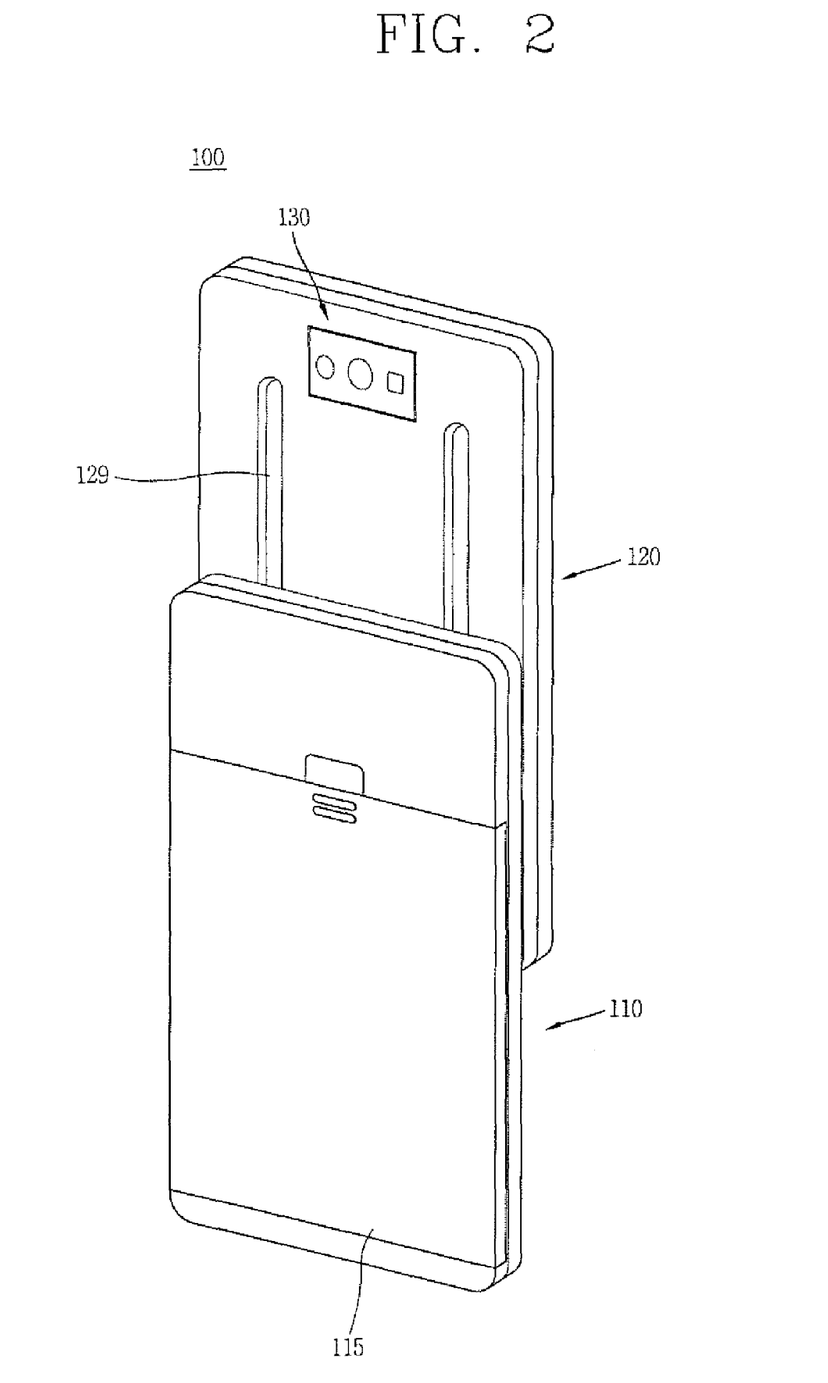
FIG. 2 is a perspective rear view of the mobile terminal of FIG. 1.

FIG. 2 is a perspective rear view of mobile terminal 100 of FIG. 1. Second body 120 is shown having a pair of sliding rails 129 which form part of a slide mechanism which permits relative linear motion between first body 110 and second body 120. According to an embodiment, reflecting unit 130 is shown located on the rear side of the second body. As will be described in more detail below, the reflecting unit permits a user to face the reflecting plate in order to position the mobile terminal relative to the user, and more particularly, to permit the user to position an associated camera in such a manner that the user can accurately frame a self-portrait. Note that the camera and/or associated reflecting unit may be located at other locations on the mobile terminal.

Figure 3:
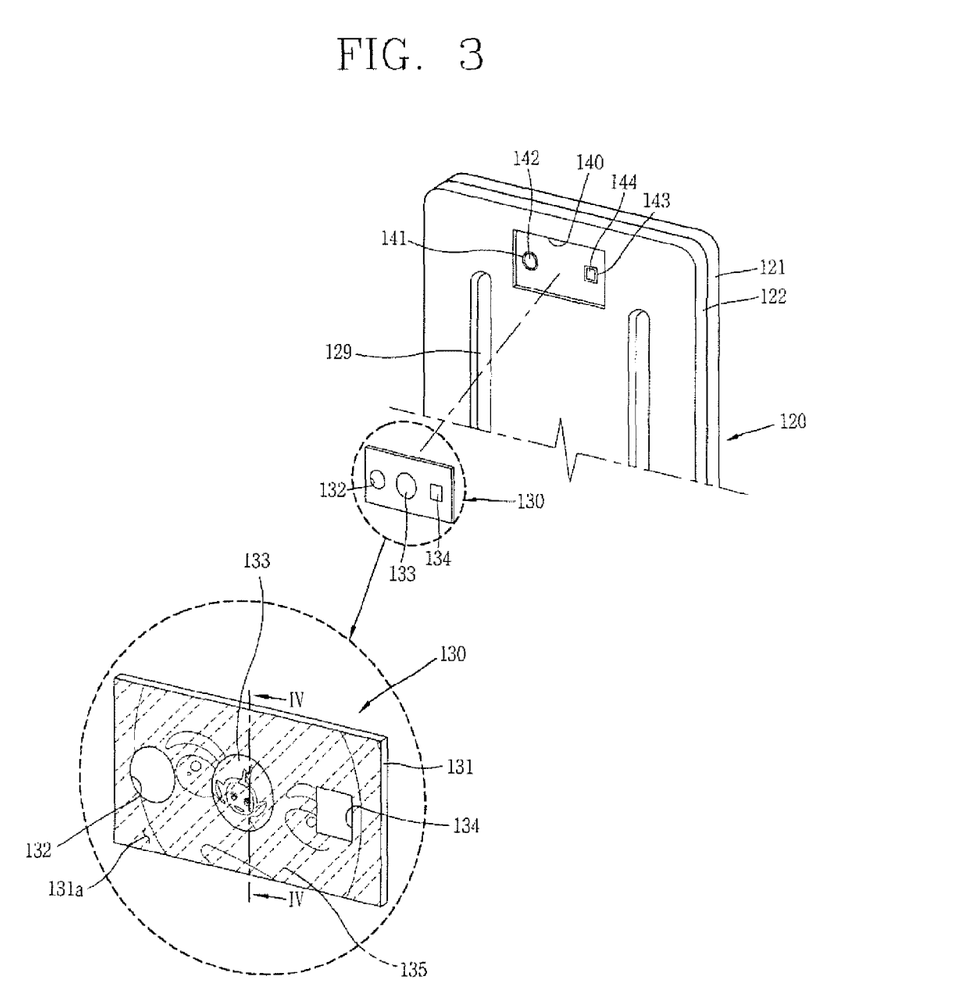
FIG. 3 is an exploded perspective partial view showing the reflecting unit of FIG. 2 separated from the second body of the mobile terminal.
Figure 4:
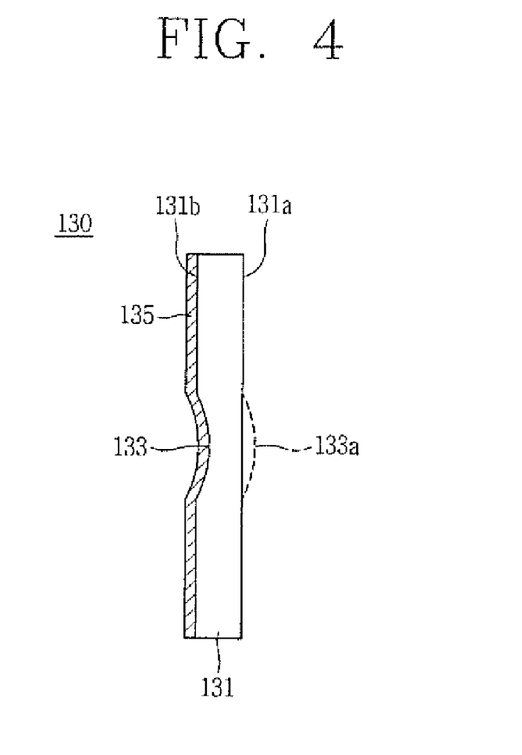
FIG. 4 is a cross-sectional view of the reflecting unit, taken along line IV-IV.

FIG. 3 is an exploded perspective partial view showing reflecting unit 130 of FIG. 2 separated from second body 120. FIG. 4 is a cross-sectional view of reflecting unit 130, taken along line IV-IV.

As shown in FIG. 3, mounting location 140 is shown formed in a recessed portion located on the rear side of lower housing 122. The mounting portion is sized to receive reflecting unit 130. The reflecting unit may be coupled to mounting portion 140 using any suitable technique such as adhesive, adhesive tape, and the like. The embodiment of FIG. 3 includes camera aperture 141 and corresponding camera 142, along with flash aperture 143 and corresponding flash 144. A benefit of this arrangement is that reflecting unit 130 functions as a protective cover for both camera 142 and flash 144.

Reflecting unit 130 includes transmissive portion 132 which is located to cooperate with camera 142, and flash exposing portion 134 which is located to cooperate with flash 144. If desired, transmissive portion 132 may alternatively be configured as an aperture through which pictures and video may be obtained. Flash exposing portion 134 may be similarly configured with an aperture which cooperates with flash 144.

In FIG. 3, an image of a user's face is shown formed on an outer surface 131a of reflecting plate 131 as a result of reflecting layer 135. In an embodiment, reflecting layer 135 is coated or otherwise formed on inner surface 131b of the reflecting plate. A condensed image of the user is shown represented on mirror portion 133 of the reflecting plate, as compared to other portions of outer surface 131a. The mirror portion is typically sized so that a portion of an object (e.g., user's face) is reflected in a reduced size. However, at other portions of outer surface 131a, only a portion of the object is reflected.

This mirror portion 133 permits a user to view their entire head, for example, without having to significantly positioning the mobile terminal with which the mirror portion is attached. Moreover, the manufacturing process is simplified since mirror portion 133 is integrally formed with reflecting plate 131, which also serves as a camera module cover. It is understood that mirror portion 133 is not formed as a protruding mirror, which is cumbersome in many situations and requires separate manufacturing steps to attach this protruding mirror.

Referring now to FIG. 4, mirror portion 133 is shown formed in a concave recess located on a rear side of reflecting unit 130. In this example, the mirror portion is spherical so that images are reflected from a front side of the reflecting unit appear to be reflected from a protruding mirror portion 133a. It is understood that mirror portion 133a refers to a virtual mirror portion as recognized by a user during use. However, no such protruding portion is required because of the concave nature of mirror portion 133. Typically, the front side of reflecting plate is flat or substantially flat.

Figure 5A:
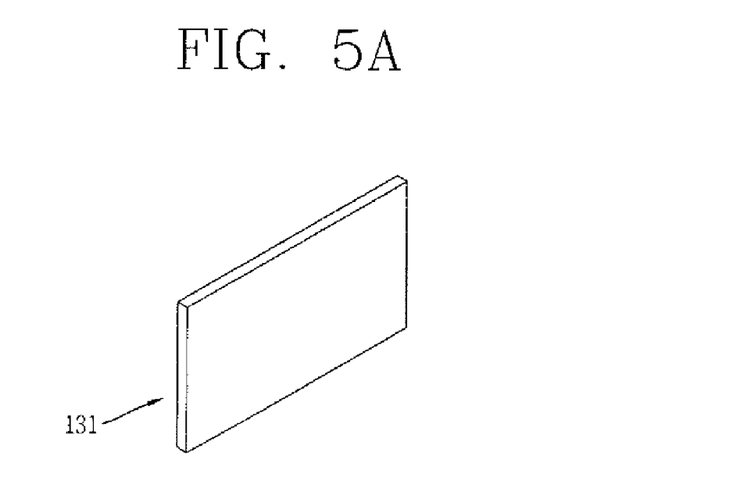
FIGS. 5A-5D are perspective views depicting a method for manufacturing a reflecting unit in accordance with an embodiment of the present invention.

FIGS. 5A-5D are perspective views depicting a method for manufacturing a reflecting unit in accordance with an embodiment of the present invention. A first operation includes preparing reflecting plate 131 (FIG. 5A). The reflecting plate may be formed from a transparent material such as an acrylic sheet, tempered glass, and the like.

Figure 5B:
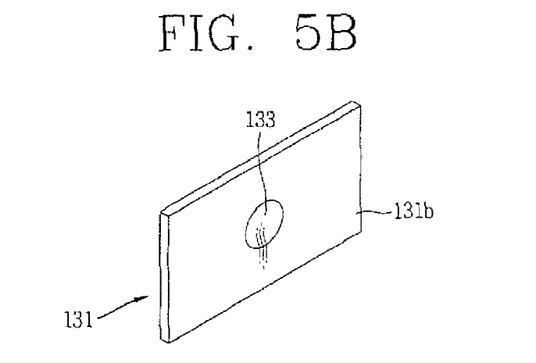

Another operation includes forming a concave or similar recess in inner surface 131b so that mirror portion 133 may later be formed (FIG. 5B). As an example, the recess may be formed using a carbide tool which will minimize or prevent damage to the reflecting plate.

Figure 5C:
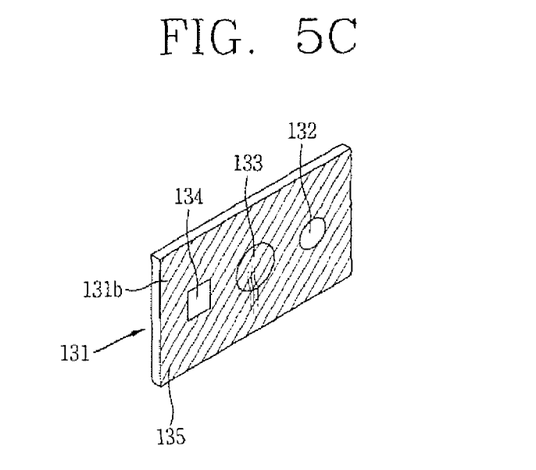

Another operation includes applying reflecting layer 135 to inner surface 131b. Suitable materials for the reflecting layer include metallic particles which reflect light (e.g., nickel particles), and the like. The metallic particles may be applied on the rear surface using a deposition process (e.g., vacuum plating or vacuum-metallization).

If desired, a coating layer may be formed on the inner surface before the deposition process. The coating layer may be formed of a UV coating layer, for example, to enhance the adhesive strength of the metallic particles during the deposition process, thereby facilitating the deposition process.

During the deposition process, tape or other techniques may be used to cover or otherwise prevent the reflective material from permanently adhering to transmissive portion 132 and flash exposing portion 134. After the deposition process the tape may be removed, thus exposing portions 132 and 134.

Performing the deposition process over the entire portion of inner surface 131b, except for portions 132 and 134, contributes to a uniform appearance of reflecting plate 131. An alternative is to apply the reflective material in a limited fashion (e.g., over only the portion which corresponds to mirror portion 133).

Figure 5D:
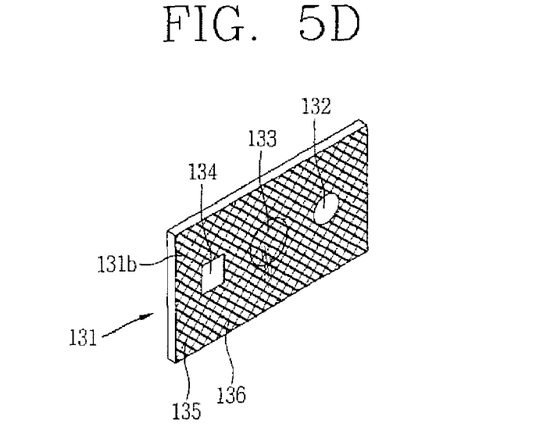

Another operation includes applying protective layer 136 to reflecting layer 135 (FIG. 5D). As an example, the protective layer may be applied using techniques such as silk-screen printing or spraying. The protective layer prevents or minimizes damage or scratching to the reflecting unit 130.

Various embodiments disclosed herein are commonly cheaper to manufacture as compared to conventional protruding mirrors which are generally formed from stainless steel. Moreover, since the reflecting unit may be formed to include an integrated camera and/or flash cover, fewer components are required, thus further towering manufacturing costs.

Although a reflecting unit may be implemented using the exemplary series of operations described herein, additional or fewer operations may be performed. Moreover, it is to be understood that the order of operations shown and described is merely exemplary and that no single order of operation is required.

Figure 6:
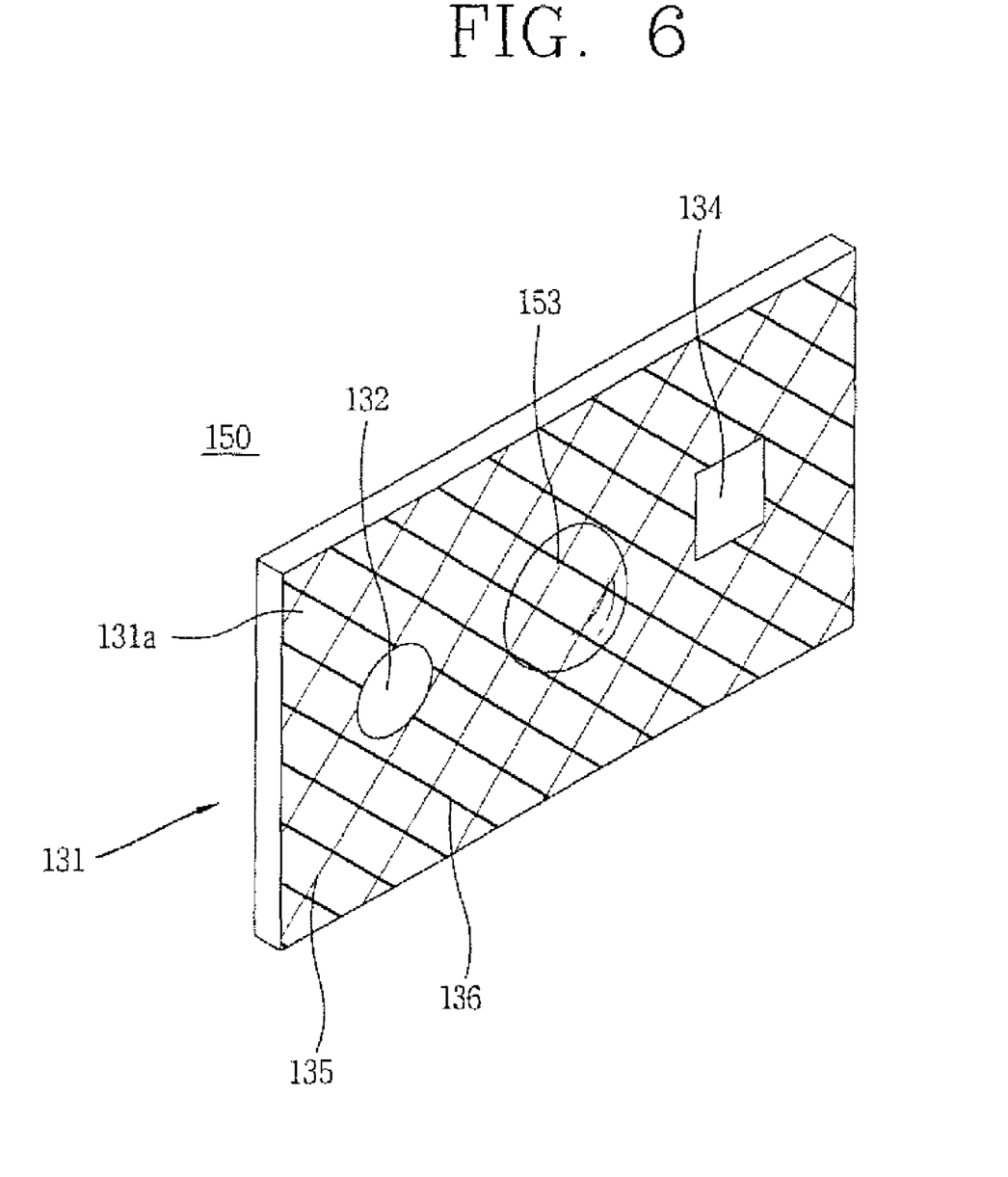
FIG. 6 is a perspective view of a reflecting unit according to another embodiment of the present invention.

FIG. 6 is a perspective view of a reflecting unit according to another embodiment of the present invention. In this embodiment, protruding mirror portion 153 is shown formed on an outer surface of reflecting plate 131. Other components of this embodiment may be implemented using techniques similar to other embodiments disclosed herein.

Figure 7:
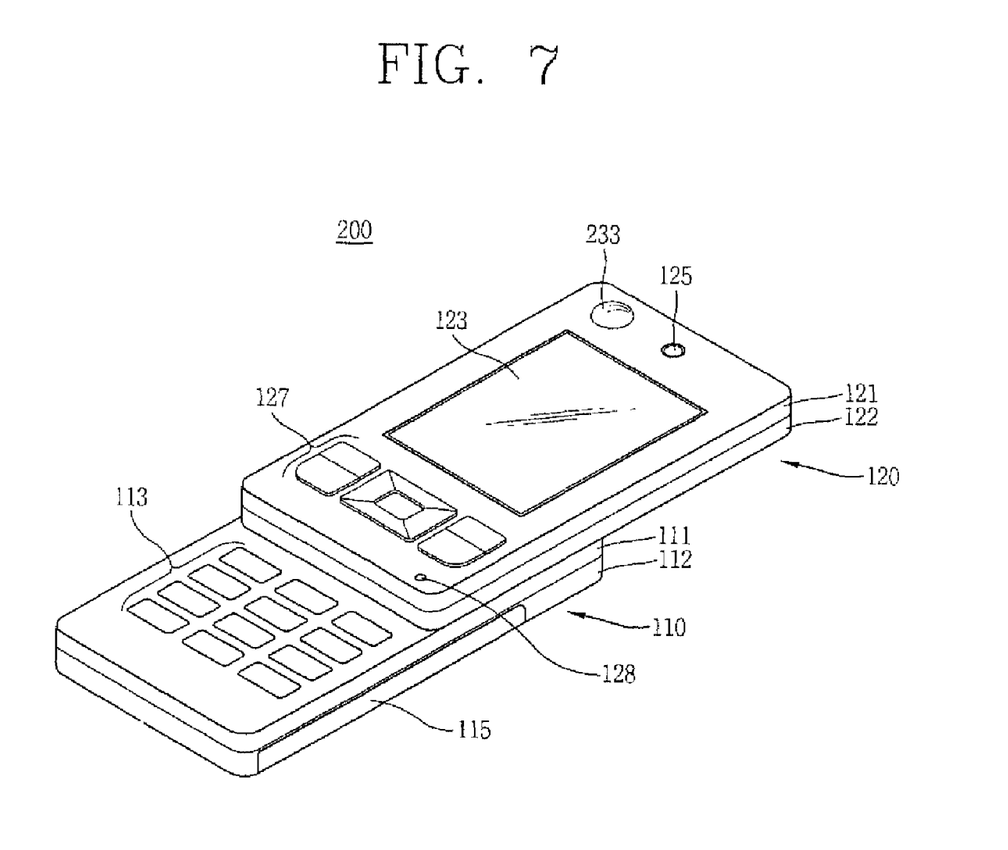
FIG. 7 depicts a slide-type mobile terminal having a mirror portion located within the housing of the terminal.

FIG. 7 depicts a slide-type mobile terminal having a mirror portion located within the housing of the terminal. Mobile terminal 200 is similar in many respects to the mobile terminal shown in FIG. 1. One difference relates to mobile terminal 200 having mirror portion 223 located on an upper location of the upper housing.

In an embodiment, mirror portion 223 is integrated with upper housing 121 such that the mirror portion is substantially flat (i.e., the mirror portion 223 lies in the same plane as the upper housing). If desired, upper housing 121 may be formed of transparent material, upon which opaque or other material may be arranged in a manner consistent with mirror portion 233.

Another alternative includes implementing mirror portion 223 as a discrete component which is mounted in upper housing 121. This embodiment is often implemented when the upper housing is formed of an opaque material or materials which are not consistent with the material used to form mirror portion 223.

Any of the just described embodiments may alternatively be configured to include mirror portion 223 as a protruding element, such as that which is depicted in the embodiment of FIG. 6.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A portable electronic device, comprising:
   a housing shaped to contain components supporting functions associated with the electronic device;
   a mounting portion located on the housing configured to receive a reflector, wherein the reflector comprises:
   a plate comprising a front side, a rear side, and a transmissive portion, wherein the front side is substantially flat, wherein the transmissive portion is configured to cover a portion of a camera module of the portable electronic device; and
   a mirror portion formed by reflecting material positioned along a recessed concave portion formed at the rear side of the plate, the mirror portion configured to reflect light incident on the front side of the plate,
   wherein the mirror portion is located at a distance from an edge of the plate,
   wherein the concave portion and the transmissive portion are integrally formed with the plate;
   wherein the rear side comprises a flat region, wherein an outer edge of the flat region is adjacent to perimeter edges of the plate, and an inner edge of the flat region is adjacent to an outer perimeter of the recessed concave portion;
   wherein an area defined by the flat region is greater than an area defined by the recessed concave portion; and
   wherein the plate is a single plate.

2. A reflector for a mobile terminal, the reflector comprising:
   a plate comprising a front side, a rear side, and a transmissive portion, wherein the front side is substantially flat, wherein the transmissive portion is configured to cover a portion of a camera module of the mobile terminal, and wherein the plate is configured to be located on the mobile terminal; and
   a mirror portion formed by reflecting material positioned along a recessed concave portion formed at the rear side of the plate, the mirror portion configured to reflect light incident on the front side of the plate,
   wherein the mirror portion is located at a distance from an edge of the plate,
   wherein the concave portion and the transmissive portion are integrally formed with the plate;
   wherein the rear side comprises a flat region, wherein an outer edge of the flat region is adjacent to perimeter edges of the plate, and an inner edge of the flat region is adjacent to an outer perimeter of the recessed concave portion;
   wherein an area defined by the flat region is greater than an area defined by the recessed concave portion; and
   wherein the plate is a single plate.

3. The reflector according to claim 2, wherein the reflecting material is also provided along the flat region.

4. The reflector of claim 2, wherein a thickness of the plate is substantially the same except for the recessed concave portion formed at the rear side of the plate.

5. The reflector of claim 2, wherein the rear side of the plate is substantially flat except for the recessed concave portion formed at the rear side of the plate.

* * * * *